Jan. 2, 1940.                R. G. DANIEL                2,185,542
                           VULCANIZER ADAPTER
                           Filed Aug. 3, 1936              2 Sheets-Sheet 1
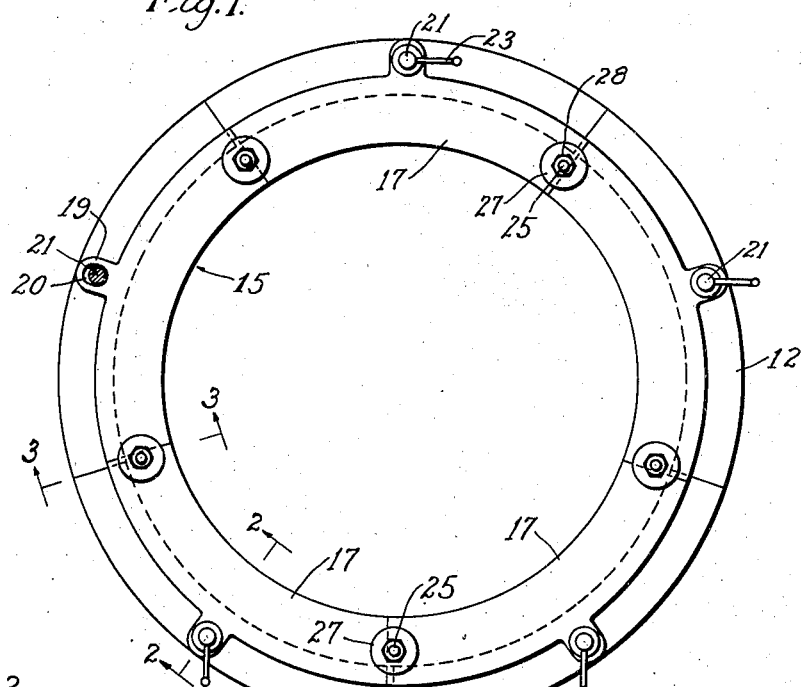
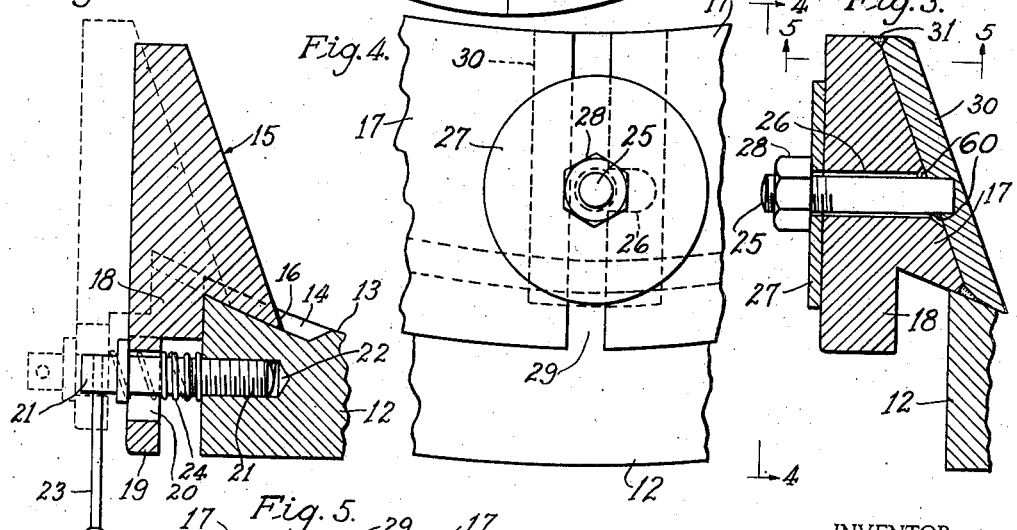
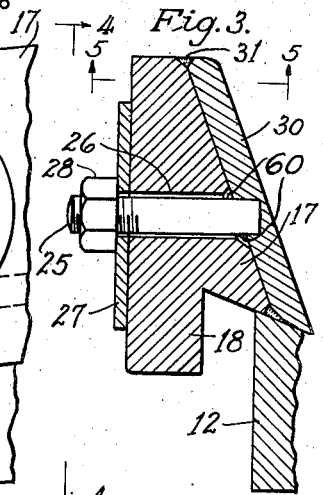
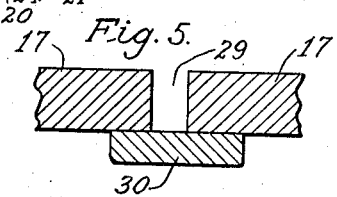
INVENTOR.
R. G. Daniel
BY Carlos G. Stratton
ATTORNEY.

Jan. 2, 1940.   R. G. DANIEL   2,185,542
VULCANIZER ADAPTER
Filed Aug. 3, 1936    2 Sheets-Sheet 2
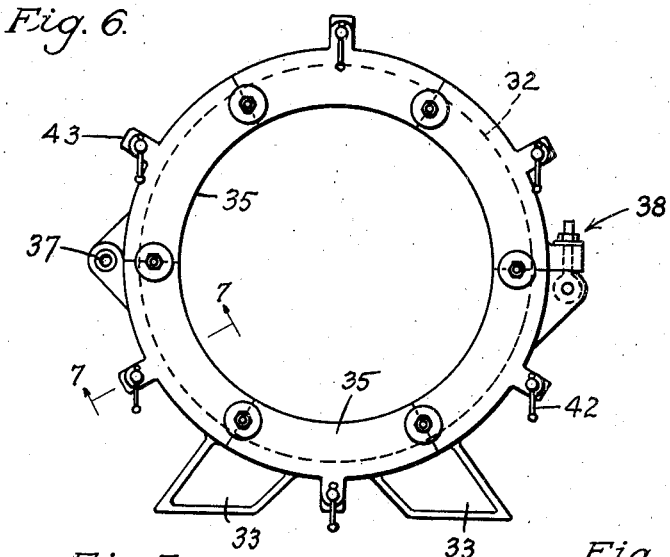
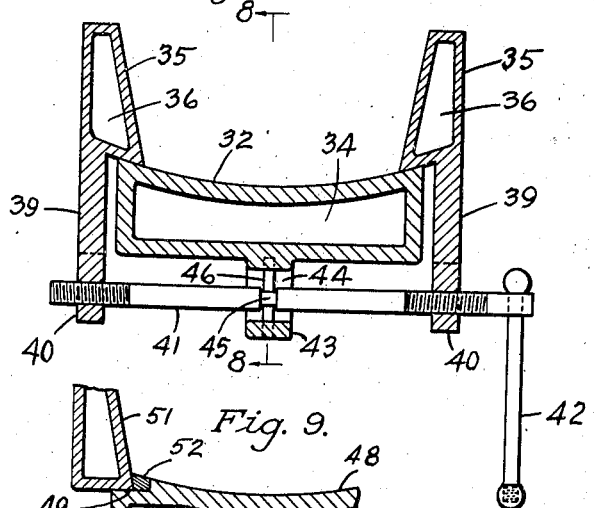
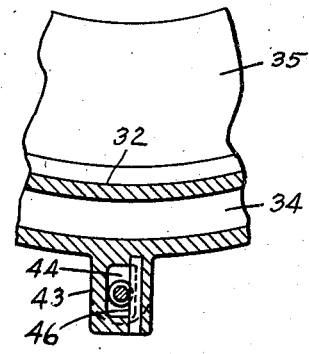
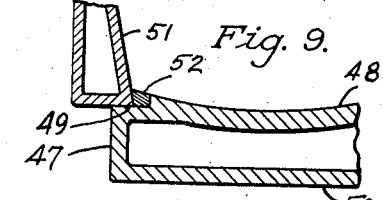
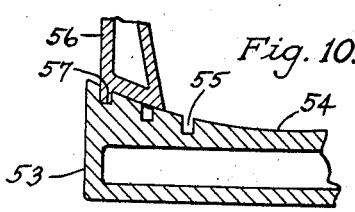
INVENTOR.
R. G. Daniel
BY Carlos G. Stratton
ATTORNEY.

Patented Jan. 2, 1940

2,185,542

UNITED STATES PATENT OFFICE 2,185,542

VULCANIZER ADAPTER

Royal G. Daniel, Beverly Hills, Calif.

Application August 3, 1936, Serial No. 93,937

12 Claims. (Cl. 18—18)

My invention relates to vulcanizer adapters, and more particularly to adjustable adapters for automobile tire vulcanizers, to adapt same to tires of different sizes.

For matter shown but not claimed herein, reference is made to my co-pending applications: Serial No. 10,600, filed March 12, 1935, and Serial No. 14,427, filed April 3, 1935.

Important objects of the invention are to provide a full-circle adapter that will accommodate tires of different sizes, and to provide shoulder plates in such an adapter that are adjustable to different diameters but at all times presenting a complete circle to tires to be vulcanized.

Another object is to provide adjusting means for such adapters.

Still other objects reside in novel ways of mounting shoulder plates upon tread plates comprised in the invention.

The invention also comprises novel details of construction and novel combinations and arrangements of parts, which will more fully appear in the course of the following description.

In the drawings, like reference characters designate similar parts in the several views:

Fig. 1 is a side view of an adapter embodying features of the present invention.

Fig. 2 is an enlarged section, taken on the line 2—2 of Fig. 1.

Fig. 3 is a similarly enlarged section, taken on the line 3—3 of Fig. 1.

Fig. 4 is a broken elevation, looking in the direction of the arrows 4—4 of Fig. 3.

Fig. 5 is a section taken on the line 5—5 of Fig. 3.

Fig. 6 is a side elevation of a modified construction.

Fig. 7 is an enlarged section taken on the line 7—7 of Fig. 6.

Fig. 8 is a section taken on the line 8—8 of Fig. 7.

Figures 9 and 10 are broken, sectional views, illustrating further modifications.

Referring more in detail to the drawings, the reference number 12 designates a sectional tread plate. It is to be understood that the inner, tire-engaging face 13 of the tread plate may have any desired design engraved therein for reproduction on the tire. A lateral groove 14 suggests such engraving. A shoulder plate 15, slidable on the tread plate, has a boss 16 that fits in the groove 14 and closes the outer end thereof, and is slidable longitudinally of the groove. This boss prevents rubber from flowing from the tire and escaping under the shoulder plate, thru the groove.

The shoulder plate 15 comprises end-abutting sections 17 provided with flanges 18 that also abut at their ends. Lugs 19, which project from these flanges, have elongated slots 20 for receiving bolts 21 that are screwed into tapped openings 22 in the tread plate. Crank handles 23 are provided for manipulating these bolts. Helical springs 24 urge the shoulder plate sections outward with respect to the tread plate 12.

The faces of the shoulder plate and the tread plate that engage during the sliding of the one on the other are preferably inclined from the horizontal, as shown in Figures 2, 3, and 7. For tires of greater thickness, the shoulder plate is moved from the full line position to the broken line position in Fig. 2. Intermediate positions of the shoulder plate are for intermediate sizes of tires.

Adjacent abutting ends of the shoulder plate sections have respectively a stud 25 and a socket 26 disposed to receive the stud. A washer 27 and a nut 28 on the stud together clamp the adjacent ends of shoulder plate sections.

To close the gap 29 that is left between the abutting ends when the shoulder plate sections are moved apart longitudinally, an offset closure plate 30 is provided. This closure plate is welded to the end of each shoulder plate section bearing the stud, as suggested at 31, and the stud 25 may be welded in a socket on the back face of the plate 30, the latter welding being suggested at 60.

In the form shown in Fig. 6, an annular tread plate 32 is mounted on feet 33. The tread plate 32 has a steam space 34. The tread plate 32 may be made sectional.

It is to be understood that when it is desired to receive a tire of larger or smaller diameter, tread plate sections 12 or 32 may be removed and similar sections having larger or smaller radii may be substituted therefor.

Shoulder plate sections 35 may be fastened together at their ends by the means described above and shown on Sheet 1 of the drawings. The sections 35 have steam spaces 36. It is believed clear without illustration that suitable connections may be made between the steam spaces 34 and 36 and a steam source (not shown).

The form of vulcanizer shown in Fig. 6 is bisected transversely and the halves are hinged together at 37, and fastening means 38 are provided for the segments.

Flanges 39 on the shoulder plate sections 35 carry right- and left-hand tapped lugs 40. A right- and left-hand threaded shaft 41 is screwed into the tapped lugs, for movement of the sections 35 in opposite directions. A crank handle 42 is afforded to operate the shaft 41.

Lugs 43 are mounted on the outer circumference of the tread plate 32. These lugs have elongated slots 44. The shaft 41 is circumferentially grooved at 45 within the slot 44. A key 46 is disposed in the slot and extends into the groove 45, to prevent longitudinal movement of the shaft 41 but permit movement lengthwise of the slot 44.

In the form shown in Fig. 9, a tread plate 47 has the usual transversely curved, tire-engaging face 48. At opposite edges of said face, the plate 47 has flat shoulders 49 disposed at right angles to the edges of the plate and parallel with the outer circumference 50 of the plate. Shoulder plate section 51 is slidable laterally upon the flat shoulders 49. Fillers 52 of varying sizes are placed between the shoulder plate and the curved face 48, to accommodate tires of different thicknesses.

In the form shown in Fig. 10, tread plate 53 has a plurality of grooves longitudinally of its inner circumference 54 as illustrated at 55. Shoulder plate section 56 has a boss 57 that fits into any selected one of the grooves. A corresponding construction is had at opposite edges of the face 54.

When one of the grooves 55 is exposed, as shown in Fig. 10, it will merely form a decorative ridge on the tire.

In the use of my full-circle, sectional shoulder plate, the sections are slidable on the inclined surface of the tread plate. As the sections are moved to different planes up and down the incline, the radius of the full circle varies. That is, when the shoulder plates 15 are at the upper portions of the inclines at the edges of the tread plate 12, as shown in Figure 3, the radius of the circle of shoulder plate sections is shorter than the radius of the circle of these sections when they are moved down the incline, as shown in Figure 2. To compensate for this variation and to avoid having gaps around the circle, closure plates 30 are employed to overlap adjacent ends of the sections.

The studs 25, nuts 28, washers 27 and sockets 26 provide means for holding together the adjacent ends of the sections in a plurality of adjusted positions.

The handles 23 afford adjusting means for permitting the springs 24 to move the shoulder sections outward. The slot 20 compensates for the rise and fall of the shoulder section relative to the tread plate.

In the form shown in Fig. 7, the shaft 41 locks the shoulder sections 35 in adjusted positions and also provides means for moving the sections to different desired positions toward and away from each other. Since the sections rise and fall because of the inclines on the tread plate 32, the shaft 41 must follow these movements. The elongated slot 44 permits lateral movement of the shaft, while the key 46 prevents longitudinal movement of the shaft.

In the form shown in Figure 9, the spacers 52 of varying sizes may be used to fill in gaps between the shoulder plate 51 and the curved surface 48 of the tread plate.

In the form shown in Fig. 10, modified means of locking shoulder plate sections 56 in adjusted positions on the inclines of a tread plate 53 are shown. The means of locking abutting ends of the shoulder sections, as shown on Sheet 1, may be employed in connection with the construction of Fig. 10. It is believed clear from the drawings that the bosses 57 of the shoulder sections 56 will fit in any of the grooves 55. When combining the end-locking means for shoulder sections, shown in Sheet 1, and the means shown in Fig. 10 for locking the shoulder sections in the tread plate, the two locking means cooperate to maintain the shoulder sections in adjusted positions relative to the tread plate.

While I have illustrated and described what I now regard as the preferred embodiment of my invention, the construction is, of course, subject to modifications without departing from the spirit of my invention. I therefore, do not wish to restrict myself to the particular form of construction illustrated and described, but desire to avail myself of all modifications which may fall within the scope of the appended claims.

Having thus described my invention, what I claim and desire to secure by Letters Patent is:

1. An adapter for tire vulcanizers, comprising a continuous tread plate, a shoulder plate for said tread plate, the shoulder plate comprising sections adjustable toward and away from each other, means for closing the gap between the sections when they are moved apart, and means to maintain the sections in adjusted positions.

2. An adapter for tire vulcanizers, comprising a longitudinally curved plate having a laterally inclined surface, a shoulder plate having sections slidable up and down said incline, the sections being adjustable endwise toward and away from each other on said incline, means for closing the gap between the sections when they are moved apart, and means to maintain the sections in adjusted positions.

3. An adapter for tire vulcanizers, comprising an annular tread plate having a laterally inclined surface, a shoulder plate having sections slidable up and down said incline, whereby the radius of the sections changes, considering the center of the tread plate as the center, the sections being adjustable endwise toward and away from each other to compensate for said change of radius, means closing the gaps between the sections when they are moved apart, and means to maintain the sections in adjusted positions.

4. An adapter for tire vulcanizers, comprising a continuous tread plate, a shoulder plate for said tread plate, the shoulder plate comprising sections adjustable toward and away from each other, an overlapping plate for closing the gap between the sections when they are moved apart, and means to maintain the sections in adjusted positions.

5. An adapter for tire vulcanizers, comprising a tread plate, a shoulder plate for said tread plate, the shoulder plate comprising sections adjustable toward and away from each other and having means for closing the gap between the sections when they are moved apart, adjacent portions of different sections having respectively a socket and a pin for engaging the socket, and means to clamp the pin in the socket and thereby clamp the sections in adjusted positions.

6. An adapter for tire vulcanizers, comprising a tread plate, a shoulder plate for said tread plate, the shoulder plate comprising sections adjustable toward and away from each other and having means for closing the gap between the sections when they are moved apart, adjacent portions of different sections having respectively a socket and a stud arranged to enter the socket, and a nut on the stud arranged to clamp the stud in the socket, the nut having means arranged to span a gap between adjacent sections, up to a predetermined size, to clamp the sections when the stud is removed from the socket within the limits of the latter means.

7. An adapter for tire vulcanizers, comprising a tread plate, a shoulder plate for said tread plate, the shoulder plate comprising sections adjustable toward and away from each other, a plate for closing the gap between the shoulder sections when they are moved apart, a stud on the closure plate, a clamping washer on the stud, the closure plate and the washer being at opposite sides of the gap when the sections are separated and the washer being of a size to bridge the gap, and a nut on the stud clamping the adjacent portions of the shoulder sections between the closure plate and the washer.

8. An adapter for tire vulcanizers, comprising a tread plate having a laterally inclined surface, a shoulder plate movable up and down said incline, a bolt on the shoulder plate having a threaded connection with the tread plate, spring means tending to move the shoulder plate up the incline when the bolt is unscrewed and the bolt being arranged to move the shoulder plate down the incline against the action of the spring.

9. An adapter for tire vulcanizers, comprising a tread plate having a laterally inclined surface, a shoulder plate movable up and down said incline, a bolt having a threaded connection with the tread plate, the bolt being substantially at right angles to the longitudinally bisecting plane of the tread plate, the shoulder plate having a slotted connection with the bolt, to permit the shoulder plate to move in a plane at an acute angle to the plane of the bolt, spring means tending to move the shoulder plate up the incline when the bolt is unscrewed and the bolt being arranged to move the shoulder plate down the incline against the action of the spring.

10. An adapter for tire vulcanizers, comprising a tread plate, shoulder plates disposed at opposite edges of the tread plate and movable laterally with respect to the tread plate, to accommodate different sizes of tires, the tread plate having grooves extending in the direction of the lateral movement of the shoulder plates, said grooves forming designs on tires, and bosses on the shoulder plates extending into and closing larger or smaller proportions of the grooves progressively at different points during the lateral movements of the shoulder plates, the bosses fitting in the grooves in the various positions of the shoulder plates and preventing rubber from flowing along the grooves past the bosses, from the portions of the grooves exposed to a tire in the adapter.

11. An adjustable adapter for tire vulcanizers, comprising a continuous, annular tread plate, annular, sectional shoulder plates arranged at the edges of the tread plate, the ends of the shoulder plate sections being adjacent but separated, means connected with the shoulder plates to move same in and out with respect to the tread plate, and means closing the gaps between adjacent ends of the shoulder plate sections, in the various positions of the shoulder plates.

12. An adjustable adapter for tire vulcanizers comprising an annular tread plate having inclined edges, annular, sectional shoulder plates arranged to move up and down the inclined edges, whereby to change the length of the radii of the annular arrangement of the shoulder plate sections by reason of the inclines, means connected with the shoulder plate sections to move the shoulder plate sections in and out with respect to the tread plate, and means progressively closing the gaps between the abutting ends of adjacent shoulder plates in the several adjusted radii.

ROYAL G. DANIEL.